UNITED STATES PATENT OFFICE.

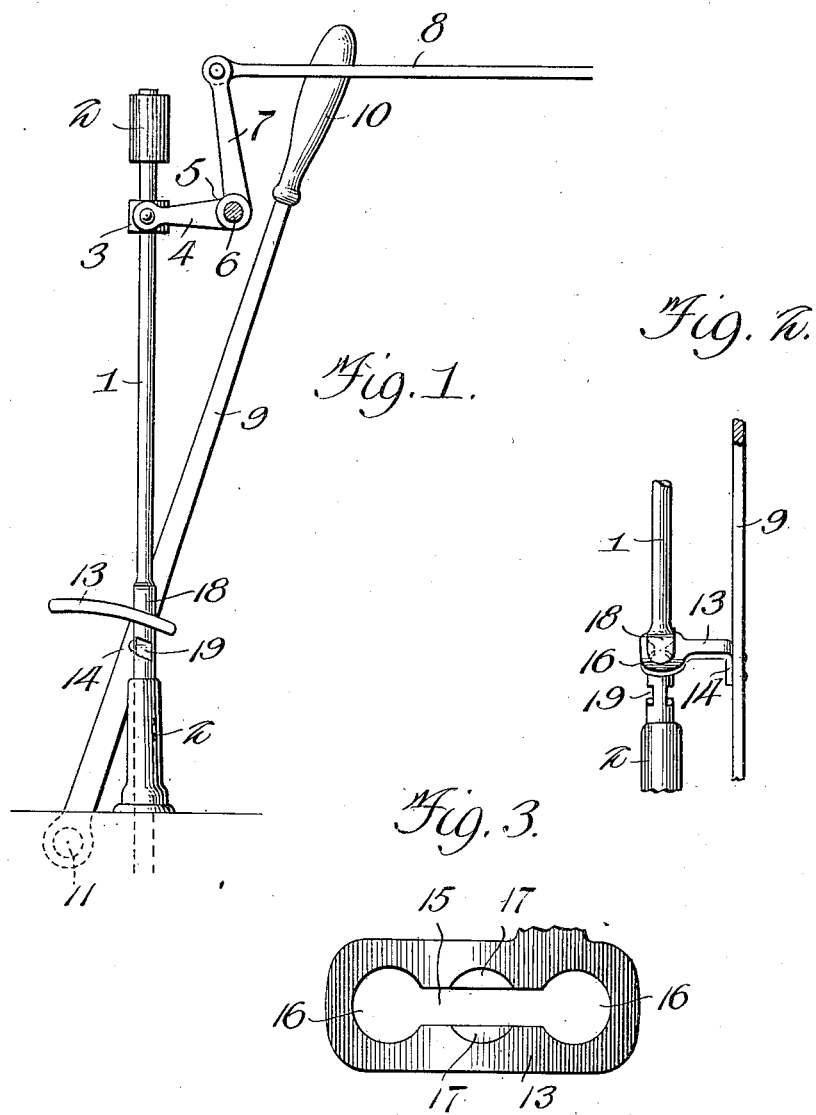

CHARLES W. GERHART, OF MOUNT HOLLY SPRINGS, PENNSYLVANIA.

LEVER MECHANISM FOR GEAR-SHIFTING.

1,076,206.   Specification of Letters Patent.   Patented Oct. 21, 1913.

Application filed May 11, 1912. Serial No. 696,769.

*To all whom it may concern:*

Be it known that I, CHARLES W. GERHART, a citizen of the United States of America, residing at Mount Holly Springs, in the county of Cumberland and State of Pennsylvania, have invented new and useful Improvements in Lever Mechanism for Gear-Shifting, of which the following is a specification.

This invention relates to improvements in lever mechanism for gear shifting and has particular application to a gear shifting lever lock.

In carrying out the present invention, it is my purpose to provide a device of the class described which will be found especially useful on motor vehicles and whereby the gear shifting lever will be locked against movement by the clutch lever, when the clutch is in active position.

Furthermore, I aim to provide a lever mechanism for gear shifting which will embrace the desired features of simplicity, efficiency and durability coupled with cheapness of cost in manufacture and marketing and which may be installed and maintained at a minimum expense.

With the above and other objects in view, the invention consists in the construction, combination and arrangement of parts hereinafter set forth in and falling within the scope of the claim.

In the accompanying drawing; Figure 1 is a side elevation of a device constructed in accordance with the present invention. Fig. 2 is a fragmentary front elevation of the same. Fig. 3 is a top plan view of a detail of the invention.

Referring now to the accompanying drawing in detail, my improved device, among its various features, embodies a clutch shifting rod 1 slidably disposed within spaced coaxial bearings 2, 2 and shiftable longitudinally of such bearings and provided adjacent to one of the latter with a collar 3 to which is fastened in any suitable manner the arm 4 of a bell crank lever 5 pivoted as at 6 to a suitable pivot post and having its opposite arm 7 pivotally connected to an operating rod 8 terminating in a suitable form of grip or handle and disposed within convenient reach of an operator so that movement of the rod 8 will, through the bell crank lever 5, impart motion to the clutch shifting rod 1 to enable the latter to couple the clutch to the engine shaft or to disconnect such clutch therefrom.

Located in proximity to the clutch shifting rod 1 and preferably parallel therewith normally, that is when the various parts are inactive, is a gear shifting lever 9 terminating at one end in a manipulating handle 10 and pivoted at its opposite extremity, as at 11, to a suitable support. This gear shifting lever 9 may be movable about a suitable notched quadrant and equipped with a locking dog to engage the notches in the quadrant to indicate the position of the lever and to hold such lever in one or the other of its respective positions, as usual. But, such quadrant and dog are not necessary and may be eliminated if desired.

The gear shifting lever 9 is connected up in any suitable manner to any appropriate form of transmission gearing and the clutch shifting rod 1 is also connected up to any approved form of clutch and is operable to render the clutch operative and inoperative, and as the majority of clutches are usually actuated to an operative position by a suitable tension means, the connection between the arm 4 of the bell crank lever 5 and the clutch shifting rod 1 may be a loose connection adapted to permit movement of the rod to render the clutch inoperative whereby the clutch, through its tension means, will assume an operative position upon the release of the operating rod of the clutch shifting rod, as will be readily understood by those skilled in the art.

In accordance with my present invention, means is provided and associated with the gear shifting lever and the clutch actuating mechanism to prevent shifting of the gears from a high to a low speed and vice versa previous to rendering the clutch inoperative from the engine or other driving motor. This means, in the present instance, consists of a segment 13 bolted or otherwise secured to an appropriate part of the gear shifting lever 9 by means of a flange 14 and provided with a central longitudinal slot 15 terminating at its opposite extremities in circular or other shaped openings 16, 16 and having its opposite walls on the upper surface of the segment depressed to provide alining semicircular or other shaped notches 17, 17. The gear clutch shifting rod 1, is passed through the segment 13 and at the portion in proximity to the slot 15 and the openings 16 contiguous such slot, is circumferentially enlarged as at 18 above the segment 13 and adjacent the enlargement 18 is circumferentially reduced as at 19 so that in the movement of the gear shifting lever 9 to change the gear ratio, the segment 13 may move relatively to the clutch shifting rod 1 and without affecting such rod. The notches 17, 17, intermediate the length of the slot 15 in the segment 13, represent the neutral position of the gear shifting lever and in this position of the lever, the enlarged portion 18 of the clutch shifting rod rests within the notches 17, 17 and holds the clutch disconnected from the engine and the lever 9 against accidental movement. On the contrary, when the gear shifting lever 9 is thrown to a position to dispose one or the other of the openings 16 in alinement with the enlarged portion 18 of the clutch shifting rod 1, such clutch shifting rod is permitted to slide through the segment and thereby facilitate the coupling of the clutch to the engine shaft, the clutch shifting rod being previously operated against the action of the tension means of the clutch so that the last-mentioned movement of the gear shifting lever may be accomplished.

The operation of my invention may be briefly described as follows: We will assume, for the purpose of illustration, that the opening 16 to the left of the slot 15 in Fig. 3, represents the high gear, while the similar opening to the right of the slot in Fig. 3 is the low gear, the notches 17, 17 being the neutral position of the gear shifting lever. Should the enlarged portion 18 of the clutch shifting rod 1 be resting within the notches 17, 17 of the segment 13 and it is desired to shift or throw the lever 9 to engage the low speed gears in the transmission system, the clutch shifting rod 1 is, through the medium of the operating rod 8 and bell crank lever 5 moved longitudinally within its bearings and against the action of the tension means of the clutch, to disengage the enlarged portion 18 of such clutch shifting rod from the notches 17 in the segment 13, thereby unlocking the gear shifting lever and permitting the latter to be actuated to obtain the desired gear ratio, the segment 13 moving freely with the lever 9, incident to the circumferentially reduced portion 19 of the clutch shifting rod being disposed within the slot 15. When the limit of movement of the lever 9, in this direction, has been attained, the clutch shifting rod 1 is released from the influence of its operating rod and, under the action of the tension means of the clutch, if such tension means is depended upon, is shifted to couple the clutch to the engine shaft, the enlarged portion 18 of the clutch rod entering the low speed opening in the segment 13. Thus, it will be seen that the parts are locked against movement and "high speed" can not be attained without disconnecting or uncoupling the clutch from the engine shaft. To throw the gear shifting lever into the "high speed" opening, the clutch shifting rod is operated as before described, and the gear shifting lever 9 moved about its pivot to bring the other of the openings 16 into alinement with the enlarged portion 18 of the clutch shifting rod 1, at which time the latter is released from its operating means to permit the coupling of the shaft to the engine, the gears, in the meantime, having been shifted to the desired speed.

From the foregoing description taken in connection with the accompanying drawing, it will be seen that by means of my invention, the gears of the transmission system, when in mesh, will be locked by the engine clutch, thereby necessitating uncoupling of the clutch previous to the shifting of the gears to step the speed up or down, thus preventing mutilation of the gears incident to "stripping" and other causes. Furthermore, it will be noted, that by means of my invention the clutch is automatically held uncoupled from the engine shaft when the gears are in an inactive position or in the "neutral," and the stepping from one speed to another, either up or down, with the clutch coupled to the engine, eliminated. In the embodiment of the invention herein shown and described, the device shown is applicable to a transmission gear system employing but two speeds. It is conceivable, however, that the invention may be adapted to a gear transmission system of any capacity and reign, and while I have herein shown and described the preferred form of my invention by way of illustration, I desire to have it understood that I do not confine myself to the exact details of construction and arrangement of the parts herein described and delineated, as modification and variation may be made within the scope of the claim and without departing from the spirit of the invention.

I claim:

The combination with a gear shifting lever, of a clutch actuating mechanism including a longitudinally shiftable clutch actuating rod provided with contiguous relatively large and small circumferences, a segment carried by the gear shifting lever and provided with a slot and having enlarged openings at the opposite extremities of the slot and in communication therewith, said slot receiving the reduced circumference of the clutch shifting rod and adapted to permit free movement of the gear shifting lever relatively to the clutch shifting rod, said openings in the segment coöperating with the enlarged portion of the clutch shifting rod to lock the lever against movement for gear shifting purposes previous to the actuation of the clutch shifting rod for releasing the clutch, and means for actuating said rod.

In testimony whereof I affix my signature in presence of two witnesses.

CHARLES W. GERHART.

Witnesses:
  WM. TRUMP,
  E. H. GERHART.

Copies of this patent may be obtained for five cents each, by addressing the "Commissioner of Patents, Washington, D. C."